United States Patent
Ji et al.

(10) Patent No.: US 11,920,764 B2
(45) Date of Patent: Mar. 5, 2024

(54) DISPLAY APPARATUS AND IN-VEHICLE DISPLAY DEVICE

(71) Applicant: HKC CORPORATION LIMITED, Shenzhen (CN)

(72) Inventors: Guofei Ji, Shenzhen (CN); Haijiang Yuan, Shenzhen (CN)

(73) Assignee: HKC CORPORATION LIMITED, Shenzhen (CN)

( * ) Notice: Subject to any disclaimer, the term of this patent is extended or adjusted under 35 U.S.C. 154(b) by 0 days.

(21) Appl. No.: 18/071,577

(22) Filed: Nov. 29, 2022

(65) Prior Publication Data

US 2023/0375163 A1 Nov. 23, 2023

(30) Foreign Application Priority Data

May 23, 2022 (CN) .......................... 202210567018.4

(51) Int. Cl.
*F21V 19/00* (2006.01)
*B60K 35/00* (2006.01)
*G06F 3/14* (2006.01)

(52) U.S. Cl.
CPC ............ *F21V 19/00* (2013.01); *G06F 3/1446* (2013.01); *B60K 35/00* (2013.01); *B60K 2370/33* (2019.05)

(58) Field of Classification Search
CPC ... F21V 19/00; G06F 3/1446; B60K 2370/33; B60K 35/00
See application file for complete search history.

(56) References Cited

U.S. PATENT DOCUMENTS

2018/0370365 A1* 12/2018 Lee .................. B60K 37/06

FOREIGN PATENT DOCUMENTS

| CN | 106251822 | A | 12/2016 |
|---|---|---|---|
| CN | 108400132 | A | 8/2018 |
| CN | 108803136 | A | 11/2018 |
| CN | 111724693 | A | 9/2020 |
| CN | 112083597 | A | 12/2020 |
| CN | 112908184 | A | 6/2021 |
| CN | 215642157 | U | 1/2022 |
| JP | 2008064790 | A | 3/2008 |

OTHER PUBLICATIONS

Chinese First Office Action, Chinese Application No. 202210567018. 4, dated Feb. 18, 2023 (13 pages).

* cited by examiner

*Primary Examiner* — Yaron Cohen

(57) ABSTRACT

Disclosed are a display apparatus and an in-vehicle display device. The display apparatus includes at least two display modules. The display modules are arranged in sequence along a first direction and includes at least one user front-view display module and at least one user side-view display module. A difference between a luminous angle of each user side-view display module and a viewing angle of the user side-view display module is within a preset difference range. The viewing angle is formed by a second direction and a normal direction of a corresponding display module, the second direction being from a point on the corresponding display module toward the user position; the luminous angle is formed by an emission direction and a normal direction of the corresponding display module; for each user side-view display module, an angle formed by the second direction and the emission direction is within a preset angle range.

18 Claims, 4 Drawing Sheets

DISPLAY APPARATUS AND IN-VEHICLE DISPLAY DEVICE

CROSS REFERENCE

The present application claims priority of Chinese Patent Application No. 202210567018.4, filed on May 23, 2022, the entire contents of which are hereby incorporated by reference in its entirety.

TECHNICAL FIELD

The present disclosure relates to the field of display technologies, and in particular to a display apparatus and an in-vehicle display device.

BACKGROUND

With the development of the modern era and the improvement of user needs, the current in-vehicle display device is usually required to be designed for a large display, in order to build a beautiful and intelligent in-vehicle display device (e.g., an in-vehicle center control display).

When the display screen of the in-vehicle display device is large, if a flat screen is applied to prepare the display screen of the in-vehicle display device, the brightness perceived by users at each point of the display screen of the in-vehicle display device may not be consistent, which makes the display effect of the in-vehicle display device poor.

To avoid the above technical problem, the display screen of the in-vehicle display device is conventionally prepared by adopting a flexible screen and a flexible substrate, such that both sides of the display screen can be bent toward the user, thereby enabling the user to perceive a more consistent brightness at each point of the display screen. However, the cost of the flexible screen is relatively high, making the cost of the in-vehicle display device also higher.

SUMMARY OF THE DISCLOSURE

The main technical problem solved by the present disclosure is how to improve the display effect of in-vehicle display device at low cost.

To solve the above technical problem, the present disclosure provides a display apparatus, applied to a vehicle and including at least two display modules; wherein the at least two display modules are arranged in sequence along a first direction and include at least one user front-view display module and at least one user side-view display module; a difference between a luminous angle of each user side-view display module and a viewing angle of the each user side-view display module is within a preset difference range; a distance between a user position and one of the at least one user front-view display module in a normal direction of the one of the at least one user front-view display module is a preset distance; the viewing angle is formed by a second direction and a normal direction of a corresponding display module, the second direction being from a point on the corresponding display module toward the user position; the luminous angle is formed by an emission direction of a light-emitting unit of the corresponding display module and a normal direction of the corresponding display module; for each user side-view display module, an angle formed by the second direction and the emission direction of the user side-view display module is within a preset angle range.

In some embodiments, each user side-view display module includes at least one column light-emitting unit, and the at least one column light-emitting unit is arranged in sequence along the first direction.

In some embodiments, each user side-view display module includes a backlight assembly, the backlight assembly including the at least one column light-emitting unit, at least one mounting substrate, and a backlight frame plate; the backlight frame plates of the at least two display modules are parallel to each other; a fixing surface of each mounting substrate is fixedly connected to the backlight frame plate, and a mounting surface of each mounting substrate is fixedly connected to a corresponding column light-emitting unit; for each user side-view display module, a difference between a dihedral angle formed by the fixed surface and the mounting surface and the viewing angle is within the preset difference range.

In some embodiments, the at least two display modules are arranged in at least two rows in sequence along the first direction to form an array of display modules.

The first side-view display module and the second side-view display module are each located in a different column from one of the at least one user front-view display module, the width of the first side-view display module along the first direction is less than the width of the second side-view display module along the first direction, and a horizontal offset distance of the first side-view display module is less than the horizontal offset distance of the second side-view display module; the horizontal offset distance is a horizontal distance between a corresponding display module and one of the at least one user front-view display module.

In some embodiments, a width of one of the at least one user front-view display module along the first direction is greater than a horizontal width threshold.

In some embodiments, a width of the one of the at least one user front-view display module along a third direction is greater than a vertical width threshold; the third direction is perpendicular to the first direction and parallel to a display surface of the one of the at least one front-view display module.

In some embodiments, a difference between the offset distance of the first side-view display module and the offset distance of the second side-view display module is greater than another preset difference threshold.

To solve the above technical solution, the present disclosure further provides an in-vehicle display device including the display apparatus as above.

Benefit of the present disclosure: different from the related art, in the technical solution of the present disclosure, on the basis of determining a user front-view display module, the viewing angle corresponding to each user side-view display module is determined according to the position of each user side-view display module in relation to the user front-view display module and the user position respectively; and the angle formed by the emission direction of the light-emitting unit in the user side-view display module and the normal direction of the corresponding display module is consistent with the viewing angle, which enables the intensity of light emitted from the user side-view display module, which is further away from the user position than the user front-view display module, to be the same as the intensity of light emitted from the user front-view display module to the user position, such that the difference in brightness perceived by the user from between the user front-view display module and the user side-view display module is reduced or disappears, which improves the consistency of the display brightness of the in-vehicle display device adopted with a flat screen and improves the display effect of the in-vehicle display device at low cost.

BRIEF DESCRIPTION OF THE DRAWINGS

In order to more clearly illustrate the technical solutions in the embodiments of the present disclosure, a brief description of the accompanying drawings to be used in the description of the embodiments will be given below. It will be obvious that the accompanying drawings in the following description are only some embodiments of the present disclosure, and that other accompanying drawings may be obtained on the basis of these drawings without any creative effort for those skilled in the art.

DETAILED DESCRIPTION

The technical solutions in the embodiments of the present disclosure will be clearly and completely described below with reference to the specification and drawings in the embodiments of the present disclosure. Obviously, the described embodiments are only a part of the embodiments of the present disclosure, but not all of the embodiments. Based on the embodiments in the present disclosure, all other embodiments obtained by those skilled in the art without creative efforts shall fall within the scope of the present disclosure.

References herein to "embodiments" mean that particular features, structures, or characteristics described in connection with an embodiment may be included in at least one embodiment of the present disclosure. The presence of the phrase at various points in the specification does not necessarily mean the same embodiment, nor is it a separate or alternative embodiment that is mutually exclusive with other embodiments. It is understood, both explicitly and implicitly, by those skilled in the art that the embodiments described herein may be combined with other embodiments.

In the description of the present disclosure, it is to be noted that unless otherwise expressly specified and limited, the terms "install", "set", "connect", "couple", etc. shall be understood in a broad sense. For example, it may be a fixed connection, a removable connection, or a one-piece connection; it may be a mechanical connection or an electrical connection; it may be a direct connection or a spaced connection through an intermediate medium. For those skilled in the art, the foregoing may be understood in specific terms as belonging to the specific meaning of the present disclosure.

Figure 1:
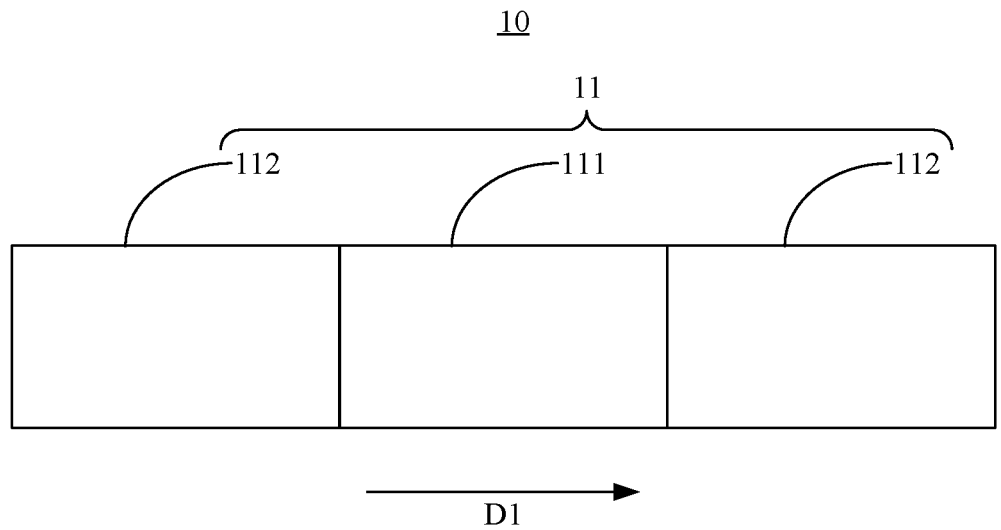
FIG. 1 is a structural schematic view of a display apparatus according to an embodiment of the present disclosure.

The present disclosure provides a display apparatus. Referring to FIG. 1, FIG. 1 is a structural schematic view of a display apparatus according to an embodiment of the present disclosure. The display apparatus 100 is applied to a vehicle and includes at least two display modules 11.

As shown in FIG. 1, the at least two display modules 11 are arranged sequentially along a first direction D1. The display device 10 may specifically be a vehicle center display for displaying vehicle status information such as vehicle speed, door opening and closing status, fuel level, etc., or may be a display for users other than the driver to watch video and film on the vehicle, or may be a display device for other purposes on the vehicle, without limitation herein.

The number of at least two display modules 11 may be any one of two, three as shown in FIG. 1, ten, and other numbers, depending on actual needs, without limitation herein. The at least two display modules 11 may form a combined display module for displaying based on all the display modules, by stitching adjacent display modules together, or by arranging each adjacent display modules at a preset interval distance, depending on actual needs, without limitation herein. The at least two display modules 11 include at least one user front-view display module 111 and at least one user side-view display module 112.

A difference between a luminous angle of the user side-view display module 112 and a viewing angle of the user side-view display module 112 is within a preset difference range, such that the user at a user position perceives the same or similar brightness from the user side-view display module 112 and the user front-view display module 111, to improve the display brightness consistency of the in-vehicle display device adopted with a flat screen and to improve the display effect of the display apparatus.

A distance between the user position and the user front-view display module 111 in a normal direction of the user front-view display module 111 is a preset distance. The viewing angle is formed by a second direction and a normal direction of a corresponding display module, the second direction being from a point on the corresponding display module toward the user position. The luminous angle is formed by an emission direction of a light-emitting unit of a corresponding display module and a normal direction of the corresponding display module. For the same user side-view display module 112, an angle formed by the second direction and the emission direction is within a preset angle range.

Specifically, the difference between the luminous angle and the viewing angle of the user side-view display module 112 is within the preset difference range, such as the difference between the luminous angle and the viewing angle of the user side-view display module 112 may be 0 degrees or 5 degrees or other values within the preset difference range. Further, the angle formed by the second direction corresponding to the user side-view display module 112 and the emission direction of the corresponding light-emitting unit is 0 degrees or 5 degrees or other values within the preset angle range. In practice, the preset difference range and the preset angle range may be adjusted according to the actual accuracy needs, without limitation herein.

Figure 2:
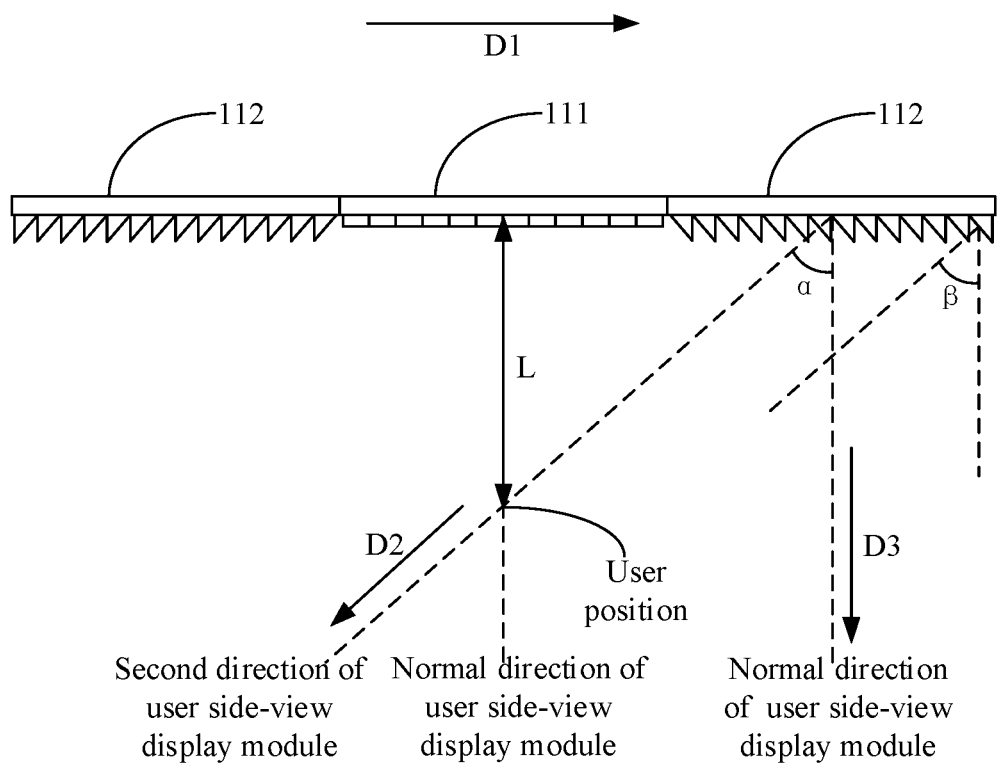
FIG. 2 is a structural schematic view of a display apparatus according to another embodiment of the present disclosure.

As shown in FIGS. 1 and 2, the at least two display modules 11 may include the user front-view display module 111 and the user side-view display module 112.

At least one display module in the at least two display modules 11 that the user is facing may be identified as the user front-view display module 111, and display modules in the at least two display modules 11 other than the user front-view display module 111 may be each identified as the user side-view display module 112, i.e., the display module in the at least two display modules 11 that the user is unable to directly face is identified as the user side-view display module 112.

The user side-view display module 112 is a display module other than the user front-view display module 111 in the at least two display modules 11. A distance between the user position and the user front-view display module 111 in a normal direction of the user front-view display module 111 is a preset distance. The viewing angle is formed by a second direction and a normal direction of a corresponding display module, the second direction being from a point on the corresponding display module toward the user position.

As shown in FIG. 2, α is a viewing angle corresponding to the user side-view display module 112, i.e., the angle formed between the normal direction D3 of the user side-view display module 112 and the second direction D2 corresponding to the user side-view display module 112. β is a luminous angle corresponding to the user side-view display module 112, i.e., the angle formed between the normal direction D3 of the user side-view display module 112 and the light-emitting unit of the user side-view display module 112. L is the preset distance.

Taking FIG. 2 as an example, there is a user side-view display module 112 arranged on the left and right of the user front-view display module 111. When the user side-view display module 112 located on the right side of the user front-view display module 111 corresponds to a first angle, correspondingly, the user side-view display module 112 located on the right side of the user front-view display module 111 corresponds to a second angle, the first angle and the second angle having opposite positive and negative signs. Therefore, a brightness corresponding to each user side-view display module 112 may be determined based on the absolute value of the viewing angle corresponding to each user side-view display module 112, respectively.

In addition, the at least one user front-view display module 111 may be arranged adjacent to each other, and at least two display modules 11 may be arranged with corresponding normal directions parallel to each other.

Different from the related art, in the technical solution of the present disclosure, on the basis of determining a user front-view display module, the viewing angle corresponding to each user side-view display module is determined according to the position of each user side-view display module in relation to the user front-view display module and the user position respectively; and the angle formed by the emission direction of the light-emitting unit in the user side-view display module and the normal direction of the corresponding display module is consistent with the viewing angle, which enables the intensity of light emitted from the user side-view display module, which is further away from the user position than the user front-view display module, to be the same as the intensity of light emitted from the user front-view display module to the user position, such that the difference in brightness perceived by the user from between the user front-view display module and the user side-view display module is reduced or disappears, which improves the consistency of the display brightness of the in-vehicle display device adopted with a flat screen and improves the display effect of the in-vehicle display device at low cost.

Figure 3:
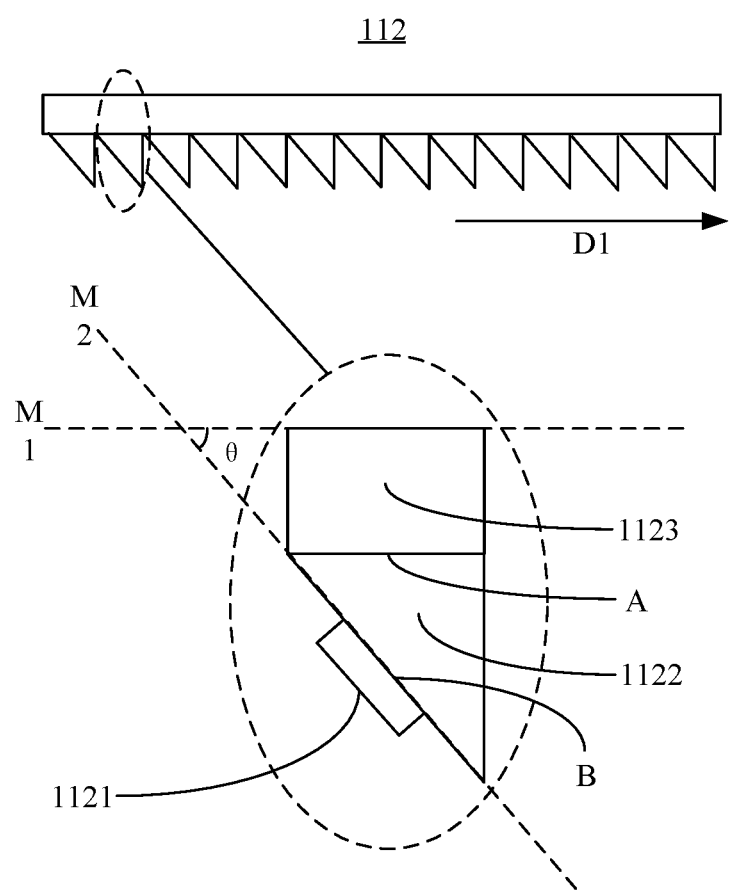
FIG. 3 is a structural schematic view of a user side-view display module according to an embodiment of the present disclosure.

In some embodiments, referring to FIG. 3, FIG. 3 is a structural schematic view of a user side-view display module according to an embodiment of the present disclosure. The user side-view display module 112 includes at least one column light-emitting unit 1121, and the at least one column light-emitting unit 1121 is arranged in sequence along the first direction D1.

Specifically, as shown in FIGS. 2 and 3, the user side-view display module 112 includes a backlight assembly, the backlight assembly includes at least one column light-emitting unit 1121, at least one mounting substrate 1122, and a backlight frame plate 1123. The backlight frame plates 1123 of the at least two display modules 11 are parallel to each other. A fixing surface A of the mounting substrate 1122 is fixedly connected to the backlight frame plate 1123, and a mounting surface B of the mounting substrate is fixedly connected to the light-emitting unit 1121. For the same user side-view display module 112, a difference between a dihedral angle θ formed by the fixed surface A and the mounting surface B and the corresponding viewing angle α in the same user side-view display module 112 is within the preset difference range. For example, the dihedral angle θ corresponding to each user side-view display module 112 may be made equal or similar to the viewing angle α, and thus the luminous angle β equal to the dihedral angle θ may be made equal or similar to the viewing angle α to improve the uniformity of the display brightness of the display device.

In some embodiments, the luminous angle of the user side-view display module 112 is less than a preset maximum angle threshold to avoid the existence of display modules with poor display effects in the display apparatus, the preset maximum angle threshold is within a preset maximum angle range. In practice, the preset maximum angle threshold may be between 35 and 45 degrees or may be in any other preset maximum angle ranges, depending on the actual situation (e.g., the characteristics of the actual display module), without limitation herein. Based on the above, the display effect of the display apparatus may be effectively improved.

In some embodiments, the at least two display modules are arranged in at least two rows in sequence along the first direction to form an array of display modules.

Figure 4:
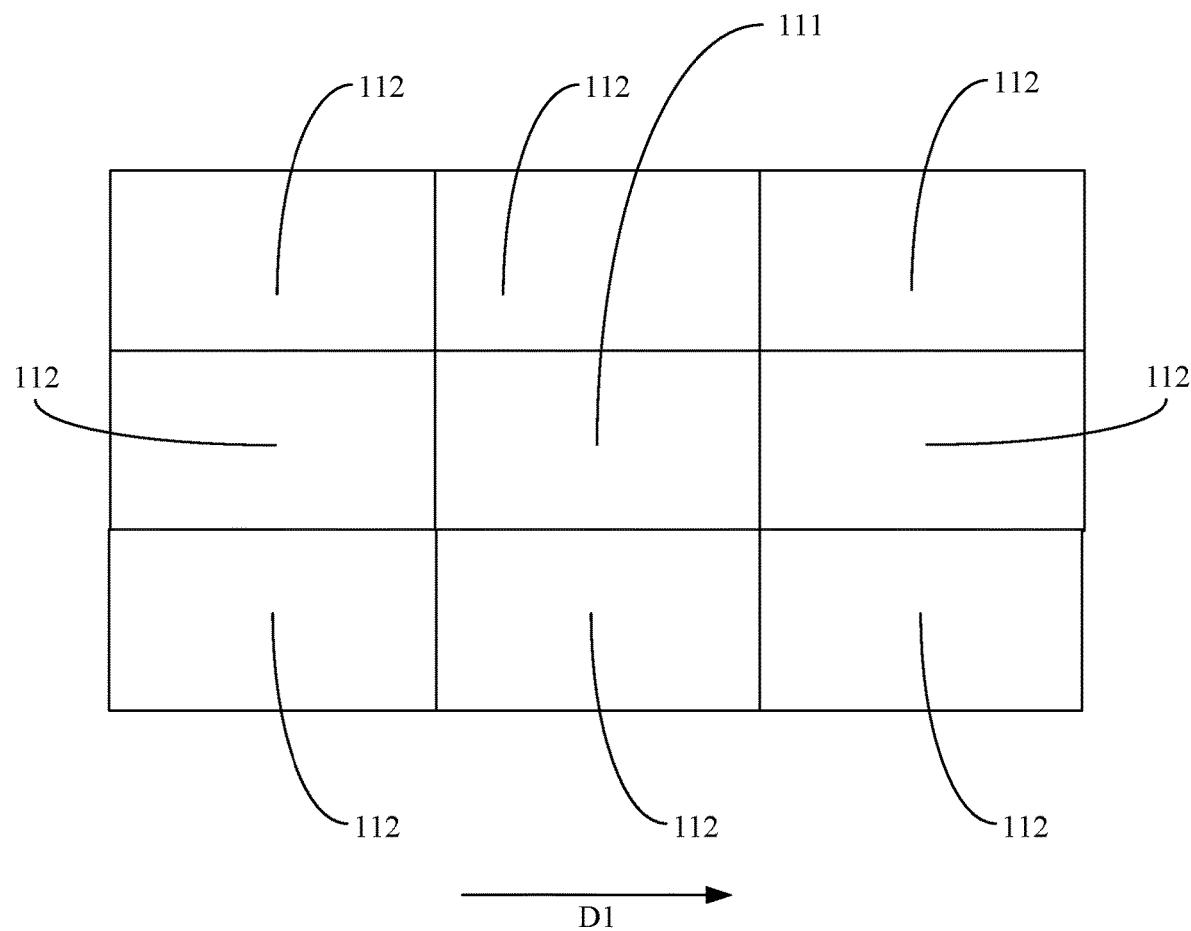
FIG. 4 is a structural schematic view of a display apparatus according to further another embodiment of the present disclosure.

Specifically, as shown in FIG. 4, FIG. 4 is a structural schematic view of a display apparatus according to further another embodiment of the present disclosure. The at least two display modules 11 are arranged in three rows in sequence along the first direction D1 to form a 3*3 array of display modules. The at least two display modules 11 may be arranged in other number of rows in sequence along the first direction D1, and the number of display modules in each row may be one of three, five or any other number, depending on the actual demand, without limitation herein.

Based on the above, a display screen of any area composed of any number of display modules may be constructed to meet diversified needs and improve the applicability of the display apparatus.

In some embodiments, in each user side-view display module, the width of a first side-view display module along the first direction is less than the width of a second side-view display module along the first direction, and an offset distance of the first side-view display module is less than the offset distance of the second side-view display module, and the offset distance is a distance between the corresponding display module and the user front-view display module.

Specifically, the first side-view display module and the second side-view display module may be any two user side-view display modules 112 of all the user side-view display modules 112 satisfying a predetermined condition.

The predetermined condition is that the width of the first side-view display module along the first direction is less than the width of the second side-view display module along the first direction, and the offset distance of the first side-view display module is less than the offset distance of the second side-view display module.

Figure 5:
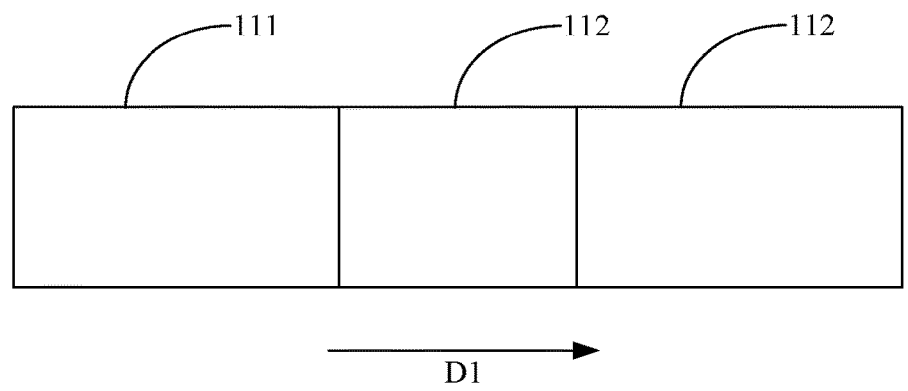
FIG. 5 is a structural schematic view of a display apparatus according to further another embodiment of the present disclosure.

As shown in FIG. 5, FIG. 5 is a structural schematic view of a display apparatus according to further another embodiment of the present disclosure. The user side-view display module 112 adjacent to the user front-view display module 111 is the first side-view display module, and the user side-view display module 112 spaced one display module away from the user front-view display module 111 is the second side-view display module.

As shown in FIG. 4, the slope of the user perceived brightness ratio increases with the decrease of the absolute value of the viewing angle. Therefore, the change of the user perceived brightness ratio caused by the increase of the offset distance when the viewing angle is small, i.e., when the user front-view display module 111 is close, is greater than the change of the user perceived brightness ratio caused by the increase of the offset distance when the viewing angle is large, i.e., when the user front-view display module 111 is far.

Based on the above solution, the width along the first direction D1 of the display module closer to the user front-view display module 111 may be less, and the width along the first direction D1 of the display module further away from the user front-view display module 111 may be greater, thereby making the difference in the brightness of adjacent ones among the display modules closer to the user front-view display module 111 perceived by the user less. In this way, the user perceives a smoother difference evolution between the display modules closer to the user front-view display module 111 to further improve the display effect of the display apparatus.

In some embodiments, the at least two display modules are arranged sequentially in at least two rows in the first direction to form an array of display modules.

In each user side-view display module, among display modules other than the display modules located in the same column as the user front-view display module, the width of a first side-view display module along the first direction is less than the width of a second side-view display module along the first direction, and a horizontal offset distance of the first side-view display module is less than the horizontal offset distance of the second side-view display module, and the horizontal offset distance is a horizontal distance between the corresponding display module and the user front-view display module.

Figure 6:
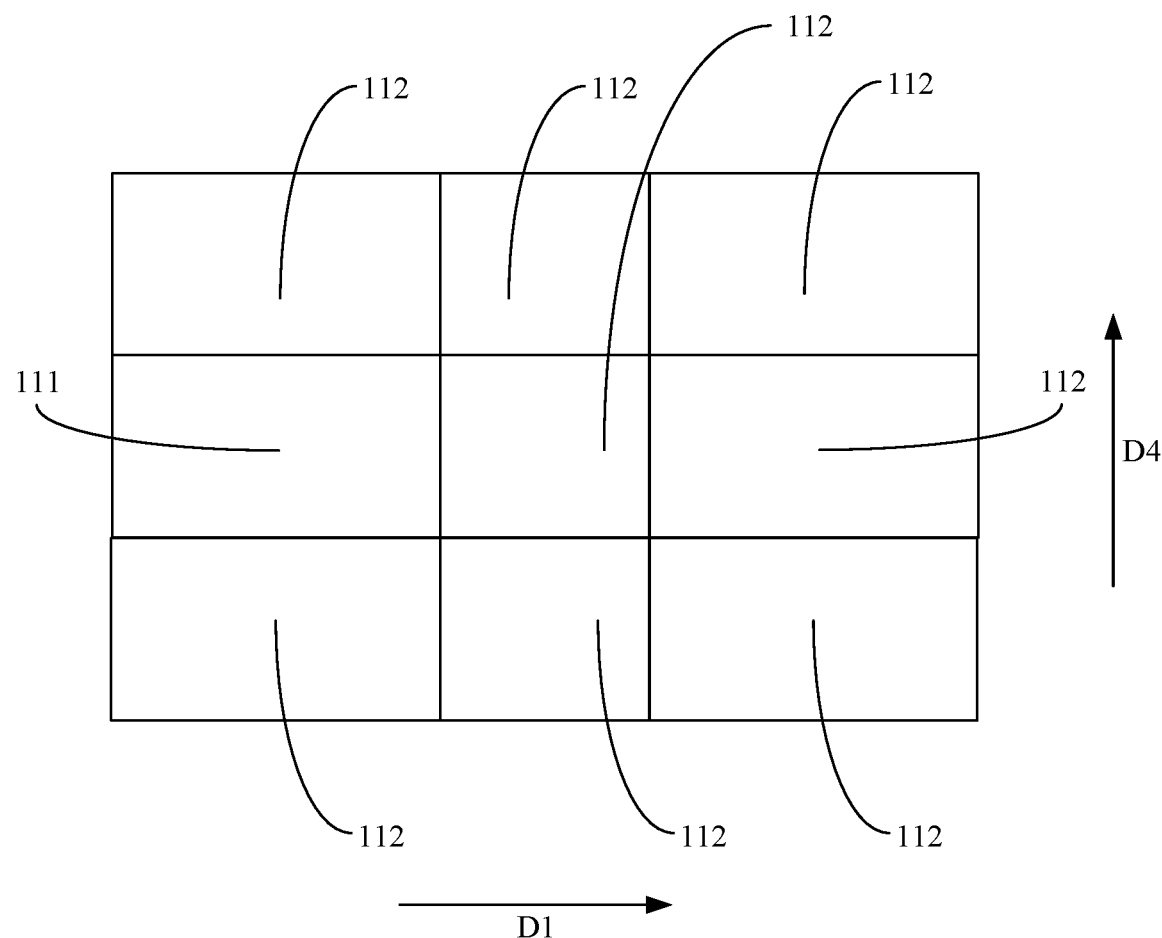
FIG. 6 is a structural schematic view of a display apparatus according to further another embodiment of the present disclosure.

Specifically, as shown in FIG. 6, FIG. 6 is a structural schematic view of a display apparatus according to further another embodiment of the present disclosure. The at least two display modules 11 are arranged in three rows in sequence along the first direction D1 to form a 3*3 array of display modules.

The first side-view display module and the second side-view display module may be any two user side-view display modules 112 that are not in the same row as the user front-view display module and meet a predefined condition. The predefined condition is that the width of the first side-view display module along the first direction is less than the width of the second side-view display module along the first direction, and the horizontal offset distance of the first side-view display module is less than the horizontal offset distance of the second side-view display module.

Based on the above solution, the width along the first direction D1 of the display module closer to the user front-view display module 111 may be less, and the width along the first direction D1 of the display module further away from the user front-view display module 111 may be greater, thereby making the difference in the brightness of adjacent ones among the display modules closer to the user front-view display module 111 perceived by the user less. In this way, the user perceives a smoother difference evolution between the display modules closer to the user front-view display module 111 to further improve the display effect of the display apparatus.

Further, the width of the user front-view display module along the first direction is greater than a horizontal width threshold, and/or the width of the user front-view display module along a third direction is greater than a vertical width threshold.

Specifically, as shown in FIG. 6, the third direction D4 is perpendicular to the first direction D1 and parallel to a display surface of the user front-view display module 111.

Based on the above solution, the widths of the user front-view display module 111 in the first direction D1 and the third direction D4 may be limited with a minimum value such that the area of the user front-view display module 111 may reach more than a predetermined area. By the setting of the user front-view display module 111 with a large enough area, the total number of at least two display modules 11 required is reduced, and the difficulty of combining the at least two display modules 11 is reduced, thereby reducing the cost of the display apparatus while not affecting the display effect of the display apparatus as much as possible.

Further, the horizontal offset distance of the first side-view display module is less than the horizontal offset distance of the second side-view display module specifically by the followings.

The offset distance of the first side-view display module is less than the offset distance of the second side-view display module, and the difference between the offset distance of the first side-view display module and the offset distance of the second side-view display module is greater than a preset difference threshold.

Specifically, the user side-view display module with the less offset distance of the two user side-view display modules may be identified as the first side-view display module, and the user side-view display module with the larger offset distance may be identified as the second side-view display module, only when the difference between the offset distances of the two user side-view display modules is greater than the preset difference threshold.

Figure 7:
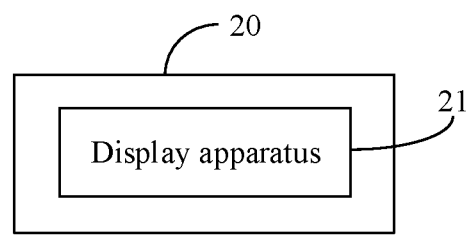
FIG. 7 is a structural schematic view of an in-vehicle display device according to an embodiment of the present disclosure.

The present disclosure further proposes an in-vehicle display device, as shown in FIG. 7, FIG. 7 is a structural schematic view of an in-vehicle display device according to an embodiment of the present disclosure. The in-vehicle display device 20 includes a display apparatus 21, and the display apparatus 21 may be any of the display apparatuses described in the preceding embodiments, which will not be repeated herein.

Different from the related art, in the technical solution of the present disclosure, on the basis of determining a user front-view display module, the viewing angle corresponding to each user side-view display module is determined according to the position of each user side-view display module in relation to the user front-view display module and the user position respectively; and the angle formed by the emission direction of the light-emitting unit in the user side-view display module and the normal direction of the corresponding display module is consistent with the viewing angle, which enables the intensity of light emitted from the user side-view display module, which is further away from the user position than the user front-view display module, to be the same as the intensity of light emitted from the user front-view display module to the user position, such that the difference in brightness perceived by the user from between the user front-view display module and the user side-view display module is reduced or disappears, which improves the consistency of the display brightness of the in-vehicle display device adopted with a flat screen and improves the display effect of the in-vehicle display device at low cost.

In the description of the present disclosure, reference is made to the terms "an embodiment," "some embodiments," "example," "specific example," or "some examples", etc., which means that the specific features, structures, materials, or characteristics described in conjunction with the embodiment or example are included in at least one embodiment or example of the present disclosure. In this specification, the schematic representation of the above terms does not have to be directed to the same embodiment or example. Moreover, the specific features, structures, materials, or characteristics described may be combined in a suitable manner in any one or more embodiments or examples. In addition, without contradicting each other, those skilled in the art may combine the different embodiments or examples described in this specification and the features of the different embodiments or examples.

In addition, the terms "first" and "second" are intended for descriptive purposes only and are not to be construed as indicating or implying relative importance or implicitly specifying the number of technical features indicated. Thus, the features qualified with "first" and "second" may explicitly or implicitly include at least one such feature. In the description of the present disclosure, "plurality" means at least two, e.g., two, three, etc., unless otherwise expressly and specifically limited.

Any process or method description described in a flowchart or otherwise described herein may be understood to represent a module, fragment, or portion of code including one or more executable instructions for implementing steps of a particular logical function or process, and the scope of embodiments of the present disclosure includes additional implementations, which may not be in the order shown or discussed, including in substantially simultaneous order depending on the function involved, or in the reverse order, as should be understood by those skilled in the art.

The logic and/or steps represented in the flowchart or otherwise described herein, for example, may be considered to be a definite sequential list of executable instructions for implementing the logical functions, which may be specifically implemented in any computer-readable medium for use by an instruction execution system, device or apparatus (which may be a personal computer, server, network device or other system that can take instructions from an instruction execution system, device or apparatus and execute the instructions) or for use in combination with the instruction execution system, device, or apparatus. For purposes of this specification, a "computer-readable medium" may be any device that can contain, store, communicate, transmit, or transfer a program for use by or in conjunction with an instruction execution system, device, or apparatus. More specific examples (a non-exhaustive list) of the computer-readable medium include: electrically connected section (electronic device) having one or more wiring, portable computer disk cartridge (magnetic device), random access memory (RAM), read-only memory (ROM), erasable programmable read-only memory (EPROM or flash memory), fiber optic device, and portable compact disc read-only memory (CDROM). In addition, the computer-readable medium may even be a paper or other suitable medium on which the program may be printed, since the program may be obtained electronically, for example, by optical scanning of the paper or other medium, followed by editing, decoding or, if necessary, processing in other suitable ways, and then storing it in the computer memory.

The above is only some embodiments of the present disclosure and is not intended to limit the scope of the present disclosure. Any equivalent structure or equivalent process transformation using the specification and the accompanying drawings of the present disclosure, or direct or indirect application in other related technical fields, is included in the scope of the present disclosure.

What is claimed is:

1. A display apparatus, applied to a vehicle and comprising at least two display modules;
   wherein the at least two display modules are arranged in sequence along a first direction and comprise at least one user front-view display module and at least one user side-view display module;
   a difference between a luminous angle of each user side-view display module and a viewing angle of the each user side-view display module is within a preset difference range;
   a distance between a user position and one of the at least one user front-view display module in a normal direction of the one of the at least one user front-view display module is a preset distance; the viewing angle is formed by a second direction and a normal direction of a corresponding display module, the second direction being from a point on the corresponding display module toward the user position; the luminous angle is formed by an emission direction of a light-emitting unit of the corresponding display module and a normal direction of the corresponding display module; for each user side-view display module, an angle formed by the second direction and the emission direction of the user side-view display module is within a preset angle range; the at least one user side-view display module comprises a first side-view display module and a second side-view display module, a width of the first side-view display module along the first direction is less than a width of the second side-view display module along the first direction, and an offset distance of the first side-view display module is less than the offset distance of the second side-view display module; and the offset distance is a distance between a corresponding display module and one of the at least one user front-view display module.

2. The display apparatus according to claim 1, wherein each user side-view display module comprises at least one column light-emitting unit, and the at least one column light-emitting unit is arranged in sequence along the first direction.

3. The display apparatus according to claim 2, wherein each user side-view display module comprises a backlight assembly, the backlight assembly comprising the at least one column light-emitting unit, at least one mounting substrate, and a backlight frame plate, so that the at least two display modules comprise a plurality of backlight frame plates; the plurality of backlight frame plates of the at least two display modules are parallel to each other; a fixing surface of each mounting substrate is fixedly connected to the backlight frame plate, and a mounting surface of each mounting substrate is fixedly connected to a corresponding column light-emitting unit; for each user side-view display module, a difference between a dihedral angle formed by the fixed surface and the mounting surface and the viewing angle is within the preset difference range.

4. The display apparatus according to claim 1, wherein the at least two display modules are arranged in at least two rows in sequence along the first direction to form an array of display modules.

5. The display apparatus according to claim 1, wherein the at least two display modules are arranged in at least two rows in sequence along the first direction to form an array of display modules;
the first side-view display module and the second side-view display module are each located in a different column from one of the at least user front-view display module, the width of the first side-view display module along the first direction is less than the width of the second side-view display module along the first direction, and a horizontal offset distance of the first side-view display module is less than the horizontal offset distance of the second side-view display module; the horizontal offset distance is a horizontal distance between a corresponding display module and one of the at least one user front-view display module.

6. The display apparatus according to claim 5, wherein a width of one of the at least one user front-view display module along the first direction is greater than a horizontal width threshold.

7. The display apparatus according to claim 6, wherein a width of the one of the at least one user front-view display module along a third direction is greater than a vertical width threshold; the third direction is perpendicular to the first direction and parallel to a display surface of the one of the at least one front-view display module.

8. The display apparatus according to claim 1, wherein a difference between the offset distance of the first side-view display module and the offset distance of the second side-view display module is greater than another preset difference threshold.

9. The display apparatus according to claim 1, wherein the luminous angle of each user side-view display module is less than a preset maximum angle threshold, the preset maximum angle threshold being within a preset maximum angle range.

10. An in-vehicle display device, comprising a display apparatus,
wherein the display apparatus comprises at least two display modules;
the at least two display modules are arranged in sequence along a first direction and comprise at least one user front-view display module and at least one user side-view display module;
a difference between a luminous angle of each user side-view display module and a viewing angle of the each user side-view display module is within a preset difference range;
a distance between a user position and one of the at least one user front-view display module in a normal direction of the one of the at least one user front-view display module is a preset distance; the viewing angle is formed by a second direction and a normal direction of a corresponding display module, the second direction being from a point on the corresponding display module toward the user position; the luminous angle is formed by an emission direction of a light-emitting unit of the corresponding display module and a normal direction of the corresponding display module; for each user side-view display module, an angle formed by the second direction and the emission direction of the user side-view display module is within a preset angle range; the at least one user side-view display module comprises a first side-view display module and a second side-view display module, a width of the first side-view display module along the first direction is less than a width of the second side-view display module along the first direction, and an offset distance of the first side-view display module is less than the offset distance of the second side-view display module; and the offset distance is a distance between a corresponding display module and one of the at least one user front-view display module.

11. The in-vehicle display device according to claim 10, wherein each user side-view display module comprises at least one column light-emitting unit, and the at least one column light-emitting unit is arranged in sequence along the first direction.

12. The in-vehicle display device according to claim 11, wherein each user side-view display module comprises a backlight assembly, the backlight assembly comprising the at least one column light-emitting unit, at least one mounting substrate, and a backlight frame plate, so that the at least two display modules comprise a plurality of backlight frame plates; the plurality of backlight frame plates of the at least two display modules are parallel to each other; a fixing surface of each mounting substrate is fixedly connected to the backlight frame plate, and a mounting surface of each mounting substrate is fixedly connected to a corresponding column light-emitting unit; for each user side-view display module, a difference between a dihedral angle formed by the fixed surface and the mounting surface and the viewing angle is within the preset difference range.

13. The in-vehicle display device according to claim 10, wherein the at least two display modules are arranged in at least two rows in sequence along the first direction to form an array of display modules.

14. The in-vehicle display device according to claim 10, wherein the at least two display modules are arranged in at least two rows in sequence along the first direction to form an array of display modules;
the first side-view display module and the second side-view display module are each located in a different column from one of the at least user front-view display module, the width of the first side-view display module along the first direction is less than the width of the second side-view display module along the first direction, and a horizontal offset distance of the first side-view display module is less than the horizontal offset distance of the second side-view display module; the horizontal offset distance is a horizontal distance between a corresponding display module and one of the at least one user front-view display module.

15. The in-vehicle display device according to claim 14, wherein a width of one of the at least one user front-view display module along the first direction is greater than a horizontal width threshold.

16. The in-vehicle display device according to claim 15, wherein a width of the one of the at least one user front-view display module along a third direction is greater than a vertical width threshold; the third direction is perpendicular to the first direction and parallel to a display surface of the one of the at least one front-view display module.

17. The in-vehicle display device according to claim 10, wherein a difference between the offset distance of the first side-view display module and the offset distance of the second side-view display module is greater than another preset difference threshold.

18. The in-vehicle display device according to claim 10, wherein the luminous angle of each user side-view display module is less than a preset maximum angle threshold, the preset maximum angle threshold being within a preset maximum angle range.

\* \* \* \* \*